United States Patent [19]

Monzini

[11] Patent Number: 4,489,972
[45] Date of Patent: Dec. 25, 1984

[54] MOTOR VEHICLE WITH TRAPEZOIDAL PASSENGER COMPARTMENT AND COMPACT SEATING ARRANGEMENT

[76] Inventor: Renato Monzini, Via Conte Verde, 16, Milan, Italy, 20100

[21] Appl. No.: 366,201

[22] Filed: Apr. 7, 1982

[30] Foreign Application Priority Data

Apr. 30, 1981 [IT] Italy .................... 21472 A/81

[51] Int. Cl.³ ............... B60N 1/00; B62D 35/00
[52] U.S. Cl. ..................... 296/64; 296/1 S; 296/185
[58] Field of Search ........... 296/1 R, 63, 64, 75, 296/147, 185, 193–198, 203, 209, 1 S; 180/72, 73, 90.6, 73.3

[56] References Cited

U.S. PATENT DOCUMENTS

| D. 146,206 | 1/1947 | Andreau | D12/91 |
|---|---|---|---|
| 2,414,730 | 1/1947 | Flogaus | 296/64 |
| 2,551,054 | 5/1951 | Sanmori | 296/1 R |
| 3,003,809 | 10/1961 | Barényi | 296/198 |
| 3,175,637 | 3/1965 | Honda | 180/72 |
| 3,298,707 | 1/1967 | Gerin | 296/1 R |
| 4,171,027 | 10/1979 | Seit et al. | 180/73.1 |

FOREIGN PATENT DOCUMENTS

| 388515 | 1/1924 | Fed. Rep. of Germany | 296/1 R |
|---|---|---|---|
| 1543249 | 9/1968 | France | 296/64 |
| 549699 | 10/1956 | Italy | 296/63 |

OTHER PUBLICATIONS

Automobile Engineer, Jul. 1955, p. 289.

Primary Examiner—David A. Scherbel
Assistant Examiner—Dennis H. Pedder
Attorney, Agent, or Firm—McGlew and Tuttle

[57] ABSTRACT

The invention relates to a motor vehicle in which the passengers are located in a fish-bone geometry, with their shoulders and heads in close relationship so as to obtain a compact arrangement at the passenger compartment center. This permits the provision of a vehicle having the best aerodynamic properties, both due to a reduction of the front cross sectional area thereof with respect to the conventional motor vehicles, and due to a better form factor particularly obtained also by spacing the passenger compartment bottom from the ground and locating the passenger legs in suitable lateral depressions provided in a location substantially aligned with and among the vehicle wheels.

8 Claims, 12 Drawing Figures

MOTOR VEHICLE WITH TRAPEZOIDAL PASSENGER COMPARTMENT AND COMPACT SEATING ARRANGEMENT

BACKGROUND OF THE INVENTION

1. Field of the Invention

This invention relates to a motor vehicle particularly designed for passenger transport, in which the particular arrangement of the passengers and the particular configuration of the vehicle body, especially in its front cross sectional area, permit aerodinamic advantages and therefore extraordinary performance to be obtained as compared with the conventional motor vehicle, particularly from the standpoint of fuel consumption reduction.

2. Description of the Prior Art

It is well known that a vehicle travelling on a road is subject to a drag ($R_a$) which is proportional to four factors, i.e. the air density, the square of the speed, the form factor (usually referred to as Cx) and the front cross sectional area of the vehicle (X). If the vehicle is travelling at a constant speed, the above relation may be written as:

$$\text{drag} = R_a = nC_xX \text{ (for any preset speed)}$$

Where n is a constant which primarily accounts for the air density factor. Vehicles which are now being manufactured have $C_x$-values which, in case of vehicles for passenger transport, range generally from 0.3 to 0.45 whereas the main area X obviously changes according to the vehicle type, but it is clearly dictated by the need of accomodating in a comfortable manner both the driver and the passengers. The latter condition, in turn (together with other factors of functional, dimensional and aesthetic nature) considerably affects the general profile of the vehicle and therefore the Ra-value or drag. The latter, in turn, affects vehicle performances and particularly fuel consumption which, as already said, increases as a function of the square of the speed and above a certain speed becomes a very decisive factor.

SUMMARY OF THE INVENTION

This being stated, the main object of this invention is to provide a motor vehicle for passenger transport, in which the passengers are located in such a manner that, without giving up at all their comfort, but rather improving it with respect to the conventional vehicles, it is possible to impart to the vehicle a conformation enabling its front area to be reduced with respect to the conventional motor vehicle having a comparable transport capacity, by conforming at the same time the vehicle so as to obtain a form factor $C_x$, which is very low and practically impossible to reach till now in commercial vehicles.

According to this invention this is essentially obtained in a motor vehicle of the above-mentioned type, in that the passenger seats are separately disposed with respect to each other in a fish-bone geometry, i.e. inclined with respect to the longitudinal axis of the vehicle, so that the passenger shoulders and heads are disposed in close relationship to each other and in a compact arrangement near said longitudinal axis of the vehicle.

As will be more apparent from the following preferred embodiment of the invention, this particular passenger arrangement permits the provision of a vehicle, in which both the form factor and the front cross sectional area are reduced, thereby obtaining a drag reduction to values which can amount of less than ⅓ of those presented by the vehicles now available on the market.

DESCRIPTION OF THE PREFERRED EMBODIMENTS

Figure 1:
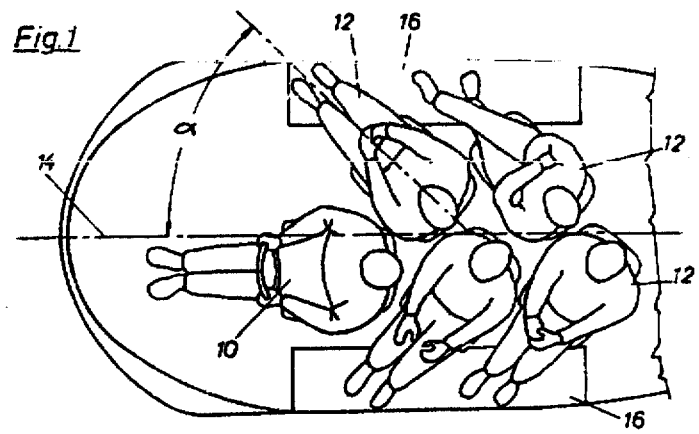
FIG. 1 is a diagrammatic plan view of the passenger and driver arrangement in a motor vehicle according to the invention, suitable for attaining the objects of this invention.
Figure 2:
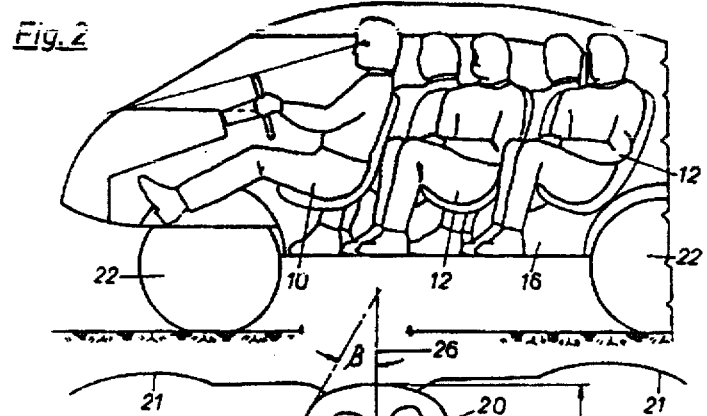
FIG. 2 is a diagrammatic elevational view of the same arrangement.

Referring now to the drawings, and particularly to FIG. 1, there is clearly shown the designed arrangement of driver 10 and passengers 12 in a motor vehicle according to the invention. This arrangement is so designed that the driver 10 is located parallel to the vehicle longitudinal axis 14, preferably shifted at the left-hand thereof, while the passengers are located at the rear of the driver, on single seats oriented so as to assume a fish-bone geometry, with an inclination angle α with respect to the longitudinal axis 14 ranging from 20° to 90°, the passengers being also preferably offset from each other in the same direction as the longitudinal axis 14. As can be better seen from FIGS. 1, 2 and 3, the driver is located with his legs at and between the front wheels 22, whereas the passenger arrangement provides for accomodating the passenger's feet within lateral bodies or spaces 16 recessed with respect to the compartment bottom 18 (FIG. 3) and extending between the front and rear wheels, substantially aligned therewith. Bodies 16 thus form enclosures for the wheels, and as will be noted later, the feet of the passengers.

The above-mentioned arrangement permits a remarkable volume and therefore size reduction to be obtained, especially in the front cross sectional area of the motor vehicle (see FIG. 3) at the point of maximum width. In the assumed case the front area is a third smaller than that of conventional vehicles for carrying the same number of passengers.

The remarkable reduction in the area X results from the fact that the five passenger's heads are very close to the vertical logitudinal center plane of the motor vehicle, so that the vehicle roof or ceiling is narrow and the cross section assumes a characteristic truncated "A" or triangular shape, with an inclination angle β of the upper portion of the passenger compartment sides to the vertical line 26 that is ≧20°. Furthermore, the legs and feet of the four passengers are accomodated in both of the lateral bodies which contain and protect the necessary four wheels of the motor vehicle.

Figure 3:
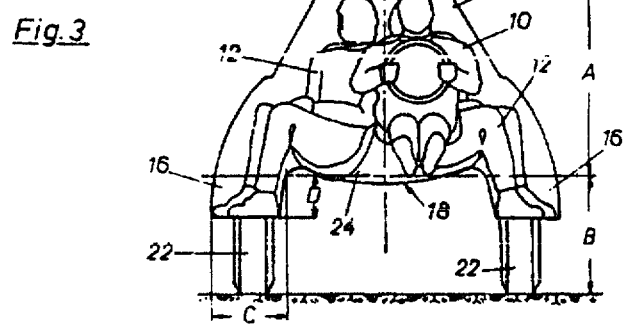
FIG. 3 is a diagrammatic front view of the motor vehicle, from which the configuration of the front cross sectional area or maximum area presented to the wind can be seen.

The front cross sectional shape of the vehicle is generally in the form of a truncated letter "A" with the lower parts of the letter forming the spaces 16 and crossing part forming the bottom 18. The motor vehicle can be therefore considered as comprised of three elements, i.e. the two lateral wheel covering bodies, which obviously are low in height, and a higher center body, the passenger compartment 20, which will accomodate the driver, the luggage of the four passengers and the engine section of the motor vehicle. The height difference between the height of the two wheel covering bodies B and the height of the passenger compartment A as shown in FIG. 3, enables the latter to be conformed according to the most convenient streamline, thereby departing from the usual rectangular design of the now used motor vehicles.

Figure 4:
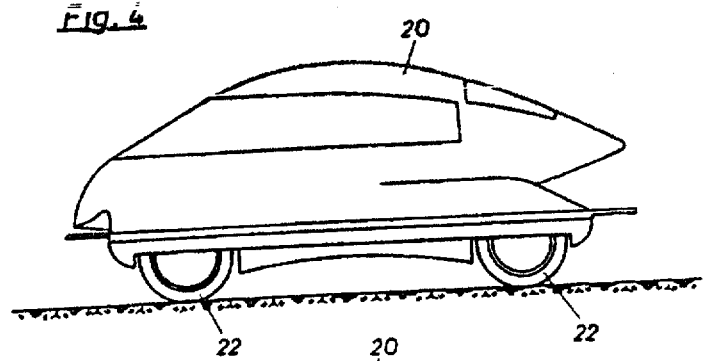
FIGS. 4, 5 and 6 are a side view, a front view and a plan view, respectively, of the motor vehicle according to this invention.
Figure 5:
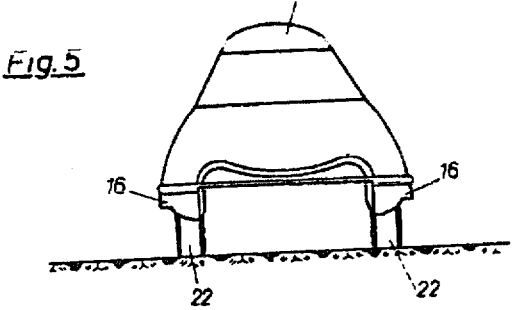
Figure 6:
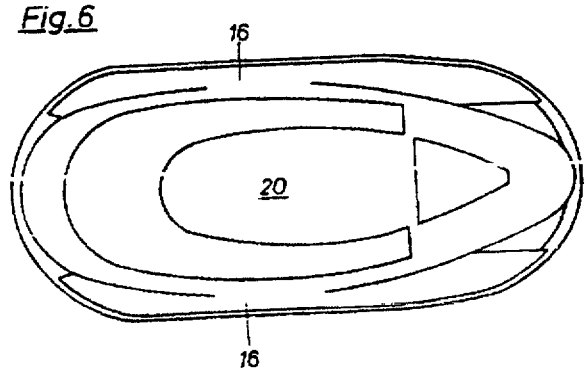

An embodiment of a motor vehicle according to the invention is shown in FIGS. 4, 5 and 6, where the streamline of the passenger compartment can be seen, which has high aerodynamic properties, and which, in order to improve this streamline, is aerodynamically separate from bodies 16 for covering the pair of wheels both at the front and at the tail of the motor vehicle. In the inventive motor vehicle, the driver and passenger access can be provided by a suitable door for the driver and two larger doors located on the vehicle sides for the passengers, the latter doors being able to open like a "gull wing" (21 in FIG. 3) so as to avoid the door opening causing a leakage of water into the vehicle when it is raining. It should be also noted that with this new fish-bone geometry, the passengers are located very close to the driver in the vehicle longitudinal direction, so that the driver and passenger group attains in the vehicle a more advanced position than in the conventional arrangement of the now used vehicles. This passenger compartment advancement enables the vehicle tail portion to be aerodynamically designed without presenting an excessive length.

In conclusion, there will be obtained a more comfortable arrangement of driver and passengers, a better utilization of the available spaces by elimination of unemployed spaces (the space between the back of the front seats and the lap of the rear passengers in the conventional vehicles), with a reduction in the main section and the possibility of obtaining a highly streamlined vehicle body without problems of size and comfort.

It should be also noted that this arrangement of driver and passengers enables the provision of a center portion or passenger compartment, having a ground spaced bottom 18, which considerably improves, as is known, the streamline of the vehicle. Of course, this is valid essentially for the compartment bottom 18 and concerns neither the wheels 22 nor the lateral bodies 16 covering the wheels 22. In order to differentiate the motor vehicle according to the invention from those of the prior art in connection with this up-shifting of the passenger compartment it is possible to define an average or mean rectangular surface of the bottom of the passenger compartment 20, as shown by line 24 in FIG. 3. This surface is actually a plane extending through a mean location of the bottom 18, having a length corresponding to the distance between the wheel axles and a width corresponding at least to ½, preferably to 3/5 of the average maximum width of the motor vehicle (average of the maximum width values in the cross sectional) always in the distance between the wheel axles. This average bottom surface is vertically spaced from the ground (with the vehicle in a travel attitude) by a length B, whereas it is vertically spaced from the vehicle top by a length A. Therefore the vehicle according to the invention has a ratio B/A corresponding at least to 0.15, preferably about 0.20 so as to assume the above stated aerodynamic properties. In the case that the lateral bodies 16 are provided in the space between the front and rear wheels these will have a inner width of at least 25 cm in order to enable the accomodation of the passenger's feet, while the vertical distance D between the bottom of these bodies 16 and the mean surface 24 is ≧10 cm. The above mentioned vehicle shape, at the bottom of the vehicle compartment, is of course maintained in any front cross section, which results in the need of providing particular driving elements for the transmission, as will be described thereinafter in connection with FIGS. 7 and 8.

At any rate, in a five-seater vehicle according to this invention, in addition to the comfort and considerably greater movement freedom for the passengers the following results have been obtained:

vehicle length = 3.50 meters
front sectional area (X) = 1.19 square-meters
Cx = 0.173

Therefore, it can be seen that a motor vehicle is obtained, which, as compared with conventional motor vehicles, is more comfortable, more compact and above all has an X-value that is reduced about one third and a Cx-value below ½ so that Ra drag is reduced by more than three times. Obviously, the remarkable power savings resulting from the lower drag permit a smaller engine to be used, with the same performances, which will be located in the rear portion of the passenger compartment.

The smaller overall dimensions of the motor vehicle and the lower power engine permit a reduction of the total vehicle weight and therefore a further fuel consumption reduction to be obtained.

Figure 7:
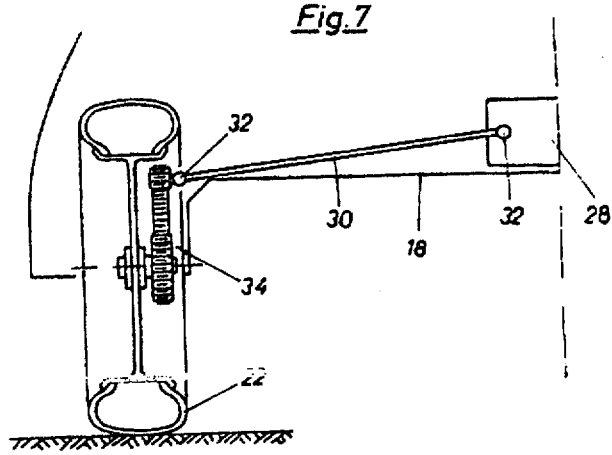
FIGS. 7 and 8 are outlines of two possible arrangements of transmission elements in order to enable the best aerodynamic properties permitted by the particular arrangement according to the invention to be achieved.
Figure 8:
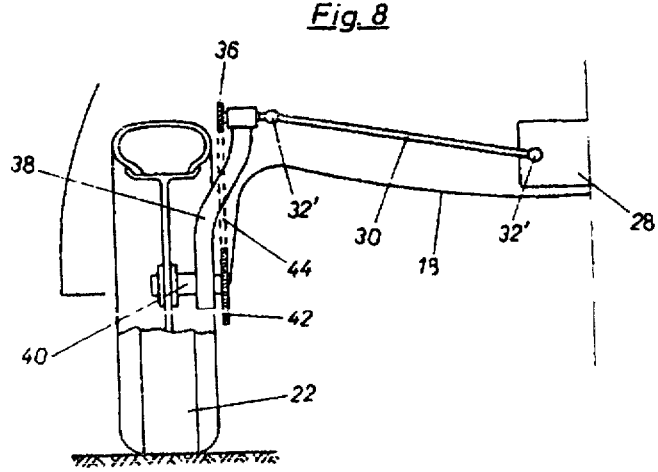

As aforesaid, in order to preserve the advantageous aerodynamic properties of the motor vehicle according to the invention and particularly the characteristic of having a passenger compartment bottom space a large vertical distance from the ground, it will be necessary to provide a power transmission to the rear vehicle wheels which fulfils the above mentioned conditions. In FIGS. 7 and 8 two possible solutions for the power transmission from the differential 28 to the rear wheels 22 are illustrated. In the former case (FIG. 7) each axle shaft 30 is inclined and connected at the ends, through ball joints 32, on the one hand to the differential 28 and on the other hand to a driving system 34 housed within the wheel 22 and using e.g. gears meshing in a chain. In the latter case (FIG. 8) each axle shaft 30, always provided with ball joints at the ends, transmits the motion to a gear 36 supported by a shaped support 38 for the wheel axle 40, which is driven by a gear 42 connected to the gear 36 through a chain 44. This embodiment permits a longitudinal offset of the axes of wheels 22 and gear 36 to be obtained, which serves to permit a better use of the available space. In FIGS. 7 and 8 at least a part of the transmission means which includes shafts 30 are disposed above the floor 18. Also the wheel axles are disposed in the enclosures formed by the lateral bodies. Of course, other solutions which will be apparent to those skilled in the art are possible and can be applied, provided that the above mentioned condition of spacing the compartment bottom surface from the ground is fulfilled.

Finally, it should be noted that the motor vehicle according to this invention provides for a further advantage as far as its stability is concerned. In fact, it is known that the stability of a motor vehicle increases as the width between the wheels increases, which in presently used vehicles is approximately proportional to the main section or front area thereof. In the motor vehicle according to this invention this proportion is no longer valid and an increase in the wheel spacing causes an increase in the main section or area, which is decidedly lower than that of conventional motor vehicles. In fact, in the conventional motor vehicles the front sectional shape of the passenger compartment is determined by the presence of the side by side arrangement of the passenger's shoulders and therefore the tapering of the upper portion of the passenger compartment is limited to the short region in which the passenger's heads are located. In the vehicle according to this invention, conversely, the passenger compartment can assume a shape nearly triangular in cross section, because its width can be suddenly reduced from a region located at about the height of the passenger's waists, since the space taken by the passenger's shoulders is no longer a decisive factor.

From the foregoing it will be apparent that various changes and modifications can be made to the invention, first of all by the provision of a vehicle having a number of seats different from five.

Figures 9, 10:
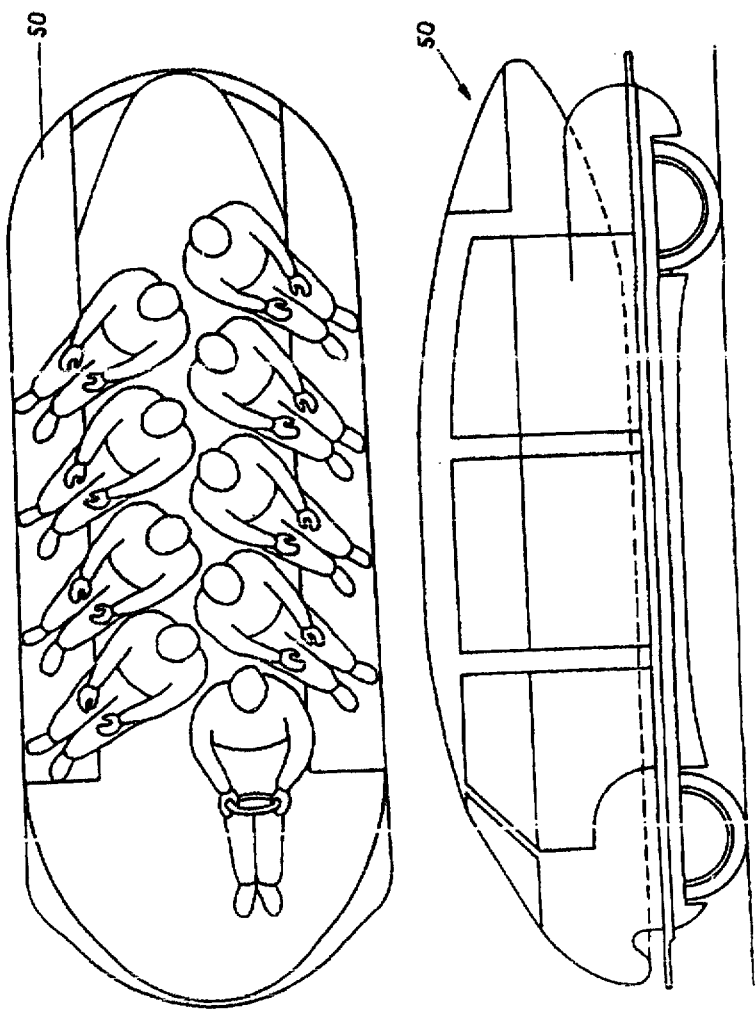
FIGS. 9, 10 and 11, 12, respectively, are diagrammatic representations in plan and side view of embodiments of a nine-seater and a three-seater vehicle according to the invention with the seats deleted for clarity.

For example, the motor vehicle designated 50 in FIGS. 9 and 10, is suitable to accomodate nine passengers, all in a comfortable position, and at the same time, in a compact arrangement. With respect to the vehicle shown in the preceding Figures, this vehicle has unchanged front and rear portions, while the center portion is lengthened a meter only in order to accomodate the further four passengers thereby assuming a length of 4.50 meters i.e. of the same order of magnitude as a midsize five seater vehicle at present available on the market.

Figure 11:
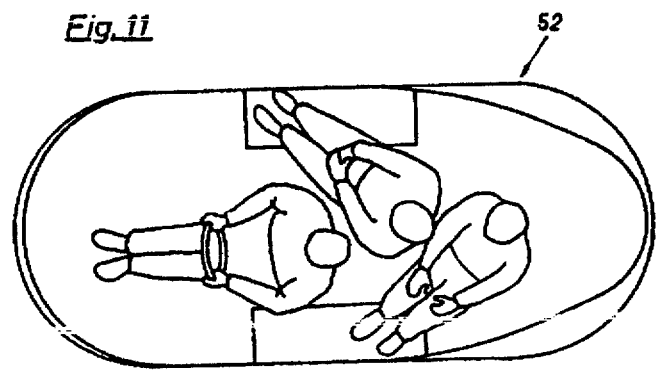
Figure 12:
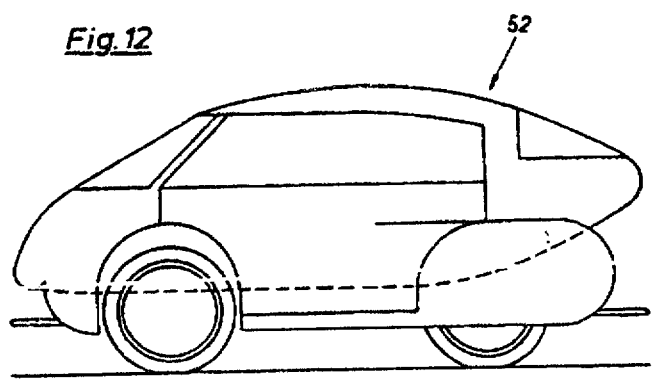

The motor vehicle designated 52 in FIGS. 11 and 12 is instead a three-seater vehicle and has a length reduced to 3 meters only, with a width of 1.30 meters. While in the preceding case the main section or maximum front area is kept unchanged, in this case the main section is reduced to 1 square meter. As a result a drag reduction is obtained and due to a lower weight, this vehicle can cover a higher mileage/liter, thereby resulting in a lower fuel consumption.

It should be noted that in all the above described embodiments the passengers can assume a comfortable seated position, because their feet are accomodated in both the lateral bodies covering the wheels. This is very important, since this is one of the characteristics permitting the above mentioned advantageous effects of the invention to be reached.

All the illustrated changes and modifications, as well as other changes which will be apparent to those skilled in the art, are to be considered within the scope of the present invention.

I claim:

1. A motor vehicle for a plurality of passengers comprising:
   - a body having a longitudinal axis lying in a direction of travel of the motor vehicle, a floor, a ceiling and a pair of side walls each extending from said floor to said ceiling, defining a passenger compartment;
   - a plurality of seats in said compartment lying in two rows extending along said longitudinal axis, each row lying adjacent one of said pair of side walls and facing at an acute angle with respect to said longitudinal axis, each seat of one of said two rows being offset with respect to each seat of the other of said two rows along said longitudinal axis so that heads and shoulders of passengers sitting in said seats are in a position of close relationship in said compartment;
   - said pair of side walls converging toward each other in a direction upwardly of said wall at about a position of waists of passengers sitting in said seats and above said position of close relationship, at an acute angle with respect to a vertical line extending through said longitudinal axis; and
   - a pair of lateral bodies each extending parallel to said longitudinal axis and lying on opposite sides of said longitudinal axis, each lateral body connected to said compartment and extending below said floor, a cross sectional shape of said compartment and connected lateral bodies being substantially in the form of a truncated letter A, said floor corresponding to a cross member of the truncated letter A and spaced above a plane on which said wheels are adapted to roll.

2. A motor vehicle for a plurality of passengers, comprising:
   - a body having a longitudinal axis lying in a direction of travel of the vehicle, a floor, a ceiling and a pair of side walls extending between said floor and said ceiling, defining a passenger compartment; and
   - a plurality of seats in said compartment lying in two rows extending along said longitudinal axis, each row lying adjacent one of said pair of side walls and facing at an angle of from 20° to 90° with respect to said longitudinal axis, each seat of one of said two rows being offset with respect to each seat of the other of said two rows along said longitudinal axis so that heads and shoulders of passengers sitting in said seats are in a position of close relationship in said compartment;
   - said pair of side walls converging toward each other in a direction upwardly of said floor at about the height of waists of passengers sitting in said seats and above said position of close relationship, at an angle of at least 20° with respect to a vertical line extending through said longitudinal axis;
   - said compartment having a cross sectional shape which is substantially in the form of a truncated letter A, said lateral bodies and said side walls being formed as two side arms of the truncated letter A, and said floor being formed as a cross member of the truncated letter A; and
   - a pair of lateral bodies extending parallel to said longitudinal axis, each connected to said body and extending below said floor and below each of said side walls, to form a pair of enclosures on opposite sides of said longitudinal axis, a pair of wheels rotatably mounted in each enclosure at a forward end thereof and at a rear end thereof with respect to said longitudinal axis, an area of each enclosure between each pair of wheels being provided for the feet of passengers sitting in said seats.

3. A motor vehicle according to claim 2, including a mean horizontal plane extending through said floor, said floor having a width transverse to said longitudinal axis of at least one half a maximum width of the motor vehicle transverse to said longitudinal axis, a height of said mean horizontal plane above a plane containing lower ends of said wheels being at least 0.15 times a height of the motor vehicle from said floor to said ceiling.

4. A motor vehicle according to claim 3, wherein the width of said floor is from one half to three fifths the average maximum width of the motor vehicle and the height of said mean horizontal plane is above 0.2 times the height of the motor vehicle from said floor to said ceiling.

5. A motor vehicle according to claim 3, wherein a lower edge of each lateral body extends at least 10 cm below said mean horizontal plane.

6. A motor vehicle according to claim 5, wherein a width of each lateral body transverse to said longitudinal axis is at least 25 cm.

7. A motor vehicle according to claim 2, including transmission means disposed above said floor, each wheel having an axle extending in one of said enclosures, and gear means connected between each axle and said transmission means, each gear means disposed at least partly in one of said enclosures.

8. A motor vehicle according to claim 2, including at least one door pivotally mounted to at least one of said side walls, for rotation about a horizontal axis adjacent said ceiling to form a gull wing door.

* * * * *